Aug. 17, 1943.   F. HUBER   2,326,946
STEERING MECHANISM FOR VEHICLES AND TRACTORS
Filed June 17, 1940   2 Sheets-Sheet 1
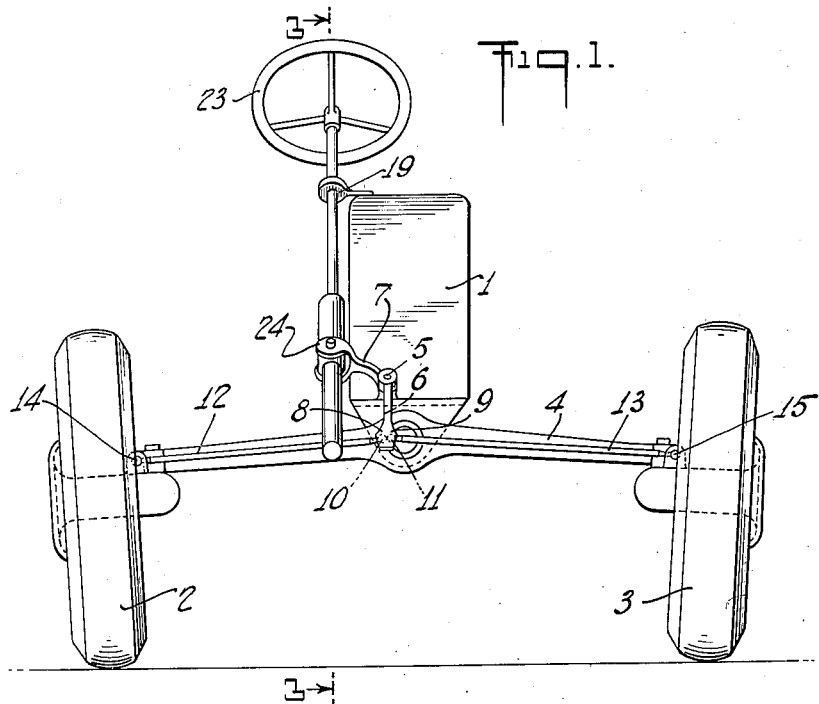
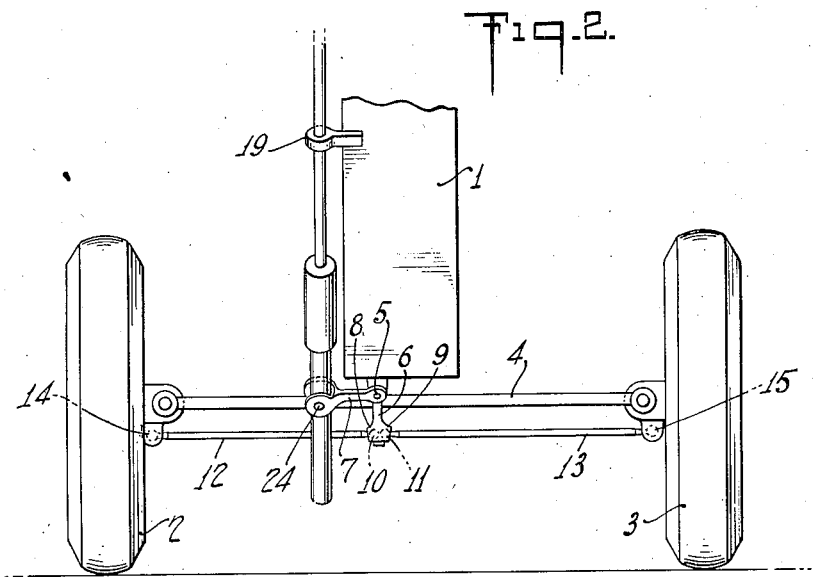
INVENTOR
FRITZ HUBER
BY Karl A. Mayr
ATTORNEY Aug. 17, 1943.    F. HUBER    2,326,946
STEERING MECHANISM FOR VEHICLES AND TRACTORS
Filed June 17, 1940    2 Sheets-Sheet 2
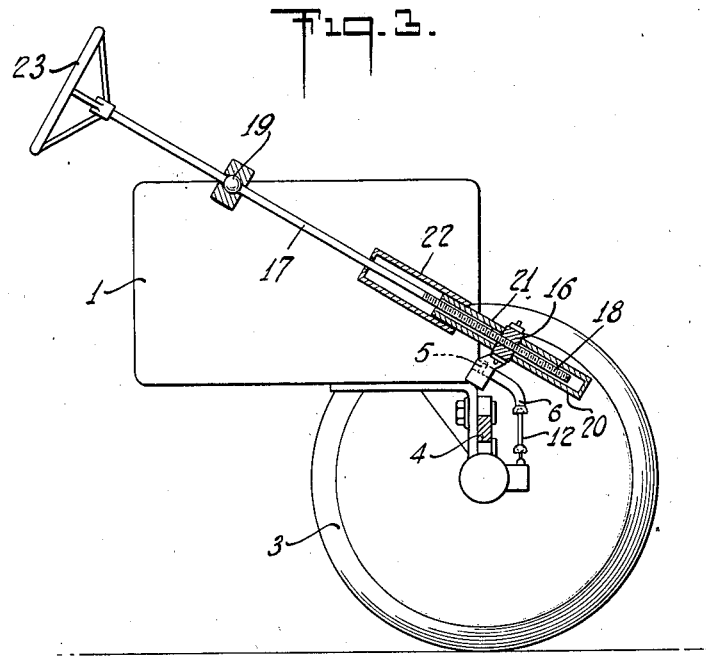
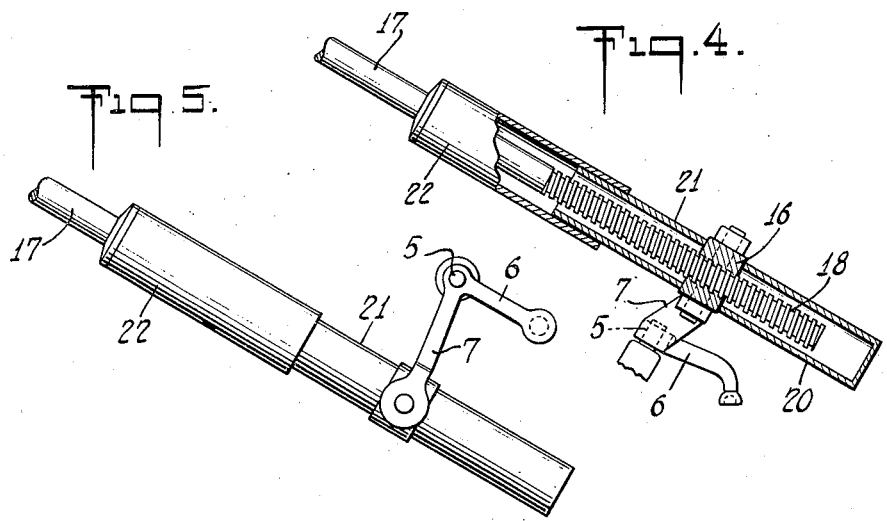
INVENTOR
FRITZ HUBER.
BY Karl A. Mayr
ATTORNEY Patented Aug. 17, 1943

2,326,946

UNITED STATES PATENT OFFICE 2,326,946

STEERING MECHANISM FOR VEHICLES AND TRACTORS

Fritz Huber, Mannheim, Germany; vested in the Alien Property Custodian

Application June 17, 1940, Serial No. 340,891
In Germany June 28, 1939

4 Claims. (Cl. 280—95)

The present invention relates to a steering mechanism for vehicles particularly for farm tractors whereby the mechanism for operatively interconnecting the steering rods with the threaded end of the operating column comprises a two arm lever.

In conventional steering mechanisms of the type set forth the threaded portion of the steering column and the two arm lever are supported in a special casing which is flanged to the vehicle. The fulcrum pin of the lever is either supported at two ends or rests in a relatively long bearing. The aforementioned casing or housing requires much space and can only be attached to special points of the vehicle whereby the attachment necessitates complicated arrangements. In many cases the clearance above the ground is thereby considerably reduced.

It is an object of the present invention to provide a steering mechanism which avoids the above set forth shortcomings of conventional mechanisms and which simplifies manufacture and supporting, and the cost of which is considerably reduced. In the mechanism according to the invention the axle about which the two arm lever swings is mounted directly, i. e. without the intermediary of a casing, to the body of the vehicle or tractor whereby one arm of said lever supports the lower end of the steering column. The said arm has a forked free end which rotatably supports the nut member cooperating with the threaded end of the steering column. Otherwise the steering column is yieldingly connected with its upper portion only with the car body; the yielding connection is provided to take care of inaccuracies of design and construction and minor relative movements of individual parts of the vehicle and the steering mechanism. It is advantageous to so arrange the swing axis of the two arm lever, that it is positioned at right angle to the steering column and in a vertical plane situated in the direction of movement of the vehicle. This arrangement considerably simplifies the steering mechanism because the support pin for the two arm lever can easily be attached to the car body and the other members of the mechanism can be built and mounted in a very simple manner. The pin can be mounted right to the front end of the vehicle body and the steering rods can be directly connected with the two arm lever without an intermediary connecting rod. One end of the two arm lever is provided, for this purpose, with spherical cavities which cooperate with correspondingly shaped ends of the steering rods. Both arms of the two arm lever may be arranged on the same side of their common pin. This results in a very compact construction and permits manufacture of the lever in one piece. The arm of the lever which is connected with and operates the steering rods may be arranged above the axis of the steered wheels whereby the lower end of the steering column is arranged crosswise with respect to the steering rods. In this case the steering rods are positioned in front of the axis of the steered wheels and greatest possible clearance above the ground can be obtained because no member of the steering mechanism according to the invention is situated underneath the vehicle or tractor. The threaded lower end of the steering column and the nut member cooperating with said end are preferably surrounded by means of telescopingly interconnected shells one of which is rigidly connected with the steering column and another is connected with the nut member. The threaded spindle end of the steering column and the nut member are thereby effectively protected against dust whereby inaccuracies of the mechanism can be taken care of by special arrangement of the shells. Because of the simple configuration and bearing arrangement of the mechanism according to the invention friction losses and wear on the individual parts is reduced to a minimum. The clearance above ground is not restricted at all.

Further and other objects of the present invention will be hereinafter set forth in the accompanying specification and claims and shown in the drawings which, by way of illustration, show what I now consider to be a preferred embodiment of my invention.

In the drawings:

Figure 1 is a front view of the mechanism according to the present invention.

Figure 2 is a top view of the mechanism according to the present invention.

Figure 3 is a part sectional side view of the mechanism according to the present invention.

Figure 4 is a part sectional large scale side view of a detail of the mechanism according to the present invention.

Figure 5 is a top view of the detail shown in Figure 4.

Like parts are designated by like numerals in all figures of the drawings.

Referring more particularly to the drawings, numeral 1 designates the body of a vehicle or tractor to which axle 4 constructed as pendulum axle is connected. Axle 4 carries the steered wheels 2 and 3. Pivot 5 is connected to the front end of the body 1 and swingably carries the two arm lever 6, 7; the arm 6 of said two arm lever extends beyond and above the axle 4 and is provided at its end with spherical bearings 8 and 9 which bearings support the heads 10 and 11 respectively of the steering rods 12 and 13 respectively which rods are disposed in front of the axle 4. The outer ends 14 and 15 of the steering rods 12 and 13 respectively are articulated to the axle journals of the steered wheels 2 and 3 respectively.

The arm 7 of the two arm lever 6, 7 has a forked end 24 which end pivotally carries the nut member 16 which is screwed to the threaded end 18 of the steering column 17. The steering column 17 comprises a ball shaped portion which is movably connected to the body of the tractor by means of a bearing 19. In order to protect the threaded spindle end 18 of the steering column 17 and the spindle nut 16 against dust etc. telescopingly cooperating shells 20, 21 and 22 are provided around said parts, the shells 20 and 21 being connected with the nut member 16 and the shell 22 with the steering column.

Upon revolving steering wheel 23 which is connected with steering column 17 the nut member 16 glides along the threaded lower end 18 of the steering column 17 and swings thereby the lever 6, 7 about its pivot 5. The arm 6 of the two arm lever swings the steering rods 12 and 13 which effect the desired position of wheels 2 and 3.

The present invention is not limited to the embodiment shown and described by way of example; other modifications and particularly the design and construction of the lever 6, 7 and its connections with the steering column and/or steering rods are possible without departing from the scope of the present invention.

I claim:

1. A steering mechanism for vehicles and tractors having a body, an axle member connected with said body, and steerable wheels connected with said axle member, said mechanism comprising a steering column having a threaded lower end portion, steering rods, a two arm lever having one arm operatively connected with and supporting said lower end portion and another arm operatively connected with said rods, and a pivot member supporting said two arm lever and being directly connected with the body of said vehicle, the arm of said two arm lever connected with said steering rods extending over said axle member.

2. A steering mechanism for vehicles and tractors having a body, said mechanism comprising a steering column having a relatively long threaded lower end portion, a relatively short nut member operatively connected with said lower end portion, steering rods, a two arm lever having one arm operatively connected with said nut member and supporting said lower end portion and another arm directly operatively connected with both said rods, a pivot member supporting said two arm lever and being directly connected with said body, and a plurality of telescopingly cooperating shell members surrounding said lower end portion, one of said shell members being connected with said steering column, and another of said shell members being connected with said nut member.

3. A steering mechanism for vehicles having a body and a pair of steerable front wheels, said mechanism comprising a steering shaft having a threaded lower end portion, two steering rods operatively connected with said wheels and disposed forward of the axes of rotation thereof, a two arm lever having one arm directly operatively connected with and supporting said lower end portion and another arm directly movably connected with both said rods, and a pivot member supporting said two arm lever and being disposed directly adjacent to and rigidly connected with the front end of said body.

4. A steering mechanism for vehicles and tractors having a body, said mechanism comprising a steering column having a threaded lower end portion, a nut member screwed to said lower end portion and having pivot extensions displaced on a diameter of said nut member, two steering rods, a two arm lever having one arm provided with a forked end swingably connected with said pivot extensions and supporting said lower end portion and another arm directly operatively connected with both said rods, and a pivot member supporting said two arm lever and being disposed directly adjacent to and connected with said body.

FRITZ HUBER.